(12) United States Patent
Shaikh

(10) Patent No.: US 8,732,043 B2
(45) Date of Patent: May 20, 2014

(54) CHARGING DIVERSIFICATION USING A MODIFIED ONLINE CHARGING INDICATOR

(75) Inventor: Imtiyaz Shaikh, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 106 days.

(21) Appl. No.: 13/217,948

(22) Filed: Aug. 25, 2011

(65) Prior Publication Data
US 2013/0054428 A1 Feb. 28, 2013

(51) Int. Cl.
*G06F 15/02* (2006.01)
*H04M 11/00* (2006.01)

(52) U.S. Cl.
USPC .............................................. 705/32; 455/406

(58) Field of Classification Search
None
See application file for complete search history.

(56) References Cited

U.S. PATENT DOCUMENTS

| | | | |
|---|---|---|---|
| 6,763,226 B1* | 7/2004 | McZeal, Jr. | 455/90.2 |
| 8,234,167 B2* | 7/2012 | Civanlar et al. | 705/14.64 |
| 8,301,123 B2* | 10/2012 | Roundtree et al. | 455/414.1 |
| 8,351,591 B2* | 1/2013 | Kirchhoff et al. | 379/212.01 |
| 8,605,874 B2* | 12/2013 | Cai | 379/114.03 |
| 2002/0023268 A1* | 2/2002 | LaRocca et al. | 725/87 |
| 2006/0050711 A1* | 3/2006 | Lialiamou et al. | 370/395.2 |
| 2007/0173226 A1* | 7/2007 | Cai et al. | 455/405 |
| 2007/0280455 A1* | 12/2007 | Cai | 379/201.01 |
| 2008/0221985 A1* | 9/2008 | Civanlar et al. | 705/14 |
| 2008/0273679 A1* | 11/2008 | Russell et al. | 379/114.28 |
| 2009/0060154 A1* | 3/2009 | Cai | 379/127.05 |
| 2009/0323636 A1* | 12/2009 | Dillon et al. | 370/331 |
| 2010/0031236 A1* | 2/2010 | Lenahan et al. | 717/120 |
| 2010/0056114 A1* | 3/2010 | Roundtree et al. | 455/414.1 |
| 2010/0316046 A1* | 12/2010 | Kalmanek et al. | 370/352 |
| 2011/0010312 A1* | 1/2011 | McDonald | 705/400 |
| 2011/0167471 A1* | 7/2011 | Riley et al. | 726/1 |
| 2011/0270722 A1* | 11/2011 | Cai et al. | 705/34 |
| 2012/0084425 A1* | 4/2012 | Riley et al. | 709/223 |
| 2012/0129488 A1* | 5/2012 | Patterson et al. | 455/406 |
| 2012/0129490 A1* | 5/2012 | Sharma et al. | 455/406 |
| 2012/0202455 A1* | 8/2012 | Cai | 455/406 |

OTHER PUBLICATIONS

3GPP Organizational Partners, "3$^{rd}$ Generation Partnership Project, Technical Specification Group Services and System Aspects, Policy and charging control architecture (Release 9)", 3GPP TS 23.203, V9.3.0 (Dec. 2009), 123 pages.

* cited by examiner

*Primary Examiner* — Mussa A Shaawat

(57) ABSTRACT

A system is configured to receive an indication that a session, associated with a user device, is to be established; obtain a profile, associated with the user device, that identifies one or more services to which a user, of the user device, has subscribed; determine that a service, associated with the session, corresponds to one of the services, where the profile identifies one or more charging actions that correspond to the service; instruct a first device to initiate online charging, when the service corresponds to a first type of service; instruct a second device to initiate offline charging, when the service corresponds to a second type of service; and instruct a third device to not initiate online charging or offline charging when the service corresponds to a third type of service.

25 Claims, 6 Drawing Sheets

| USER DEVICE ID 405 | SERVICE TYPE 410 | RTR 420 | UC 430 | PREPAID DATA 440 | PREPAID VoIP 450 | OFFLINE 460 | CHARGING ACTION 470 |
|---|---|---|---|---|---|---|---|
| MDN1 | POSTPAID DATA | YES | NO | NO | NO | YES | offline / online |
| MDN2 | POSTPAID VOICE | NO | NO | NO | NO | NO | null |
| MDN3 | PREPAID DATA | YES | YES | YES | NO | NO | online |
| MDN4 | PREPAID VoIP | NO | NO | NO | NO | NO | null |
| ... | | | | | | | |

CHARGING DIVERSIFICATION USING A MODIFIED ONLINE CHARGING INDICATOR

BACKGROUND

Evolved Packet System (EPS) is a core network architecture associated with the third generation partnership project (3GPP) wireless communication standard. The EPS includes an evolved packet core (EPC) through which traffic, associated with a communication session with a user device, is transported to and/or received from a network (e.g., the Internet, a packet data network, etc.). The EPS also includes a long term evolution (LTE) network, which is a radio access network (RAN) via which the user device communicates with the EPC during the communication session. The EPS may communicate with an Internet protocol (IP) multimedia subsystem (IMS) core. The IMS core may manage authentication, session initiation, account information, profile information, etc. associated with the user device.

The IMS core may permit a communication session to be established, between a user device and a destination device, that allows the user device to access a service from, place a call to, and/or exchange messages with the destination device. A policy charging and rules function (PCRF) server may identify a manner in which to charge a user, of the user device, based on a charging action associated with the session. An offline charging action may usually be used for postpaid services where the user is billed at the end of a time period (e.g., on a monthly basis, a semi-monthly basis, etc.) based on an amount of data and/or bandwidth used. An online charging action may usually be used for prepaid services where usage and/or charges are determined and/or controlled on a near real-time basis based on an amount of data and/or bandwidth used. A null charging action may permit the user to be billed based on minutes of usage (e.g., when neither an online nor offline charging action is performed). Unfortunately, as more and more types of services and/or traffic types are being transmitted via the EPS, it is becoming more and more difficult to identify which charging action is to be used for a particular communication session.

BRIEF DESCRIPTION OF THE DRAWINGS

FIG. 4 is a diagram of an example data structure to store information associated with a subscriber profile according to an implementation described herein;

DETAILED DESCRIPTION OF PREFERRED EMBODIMENTS

Figure 1:
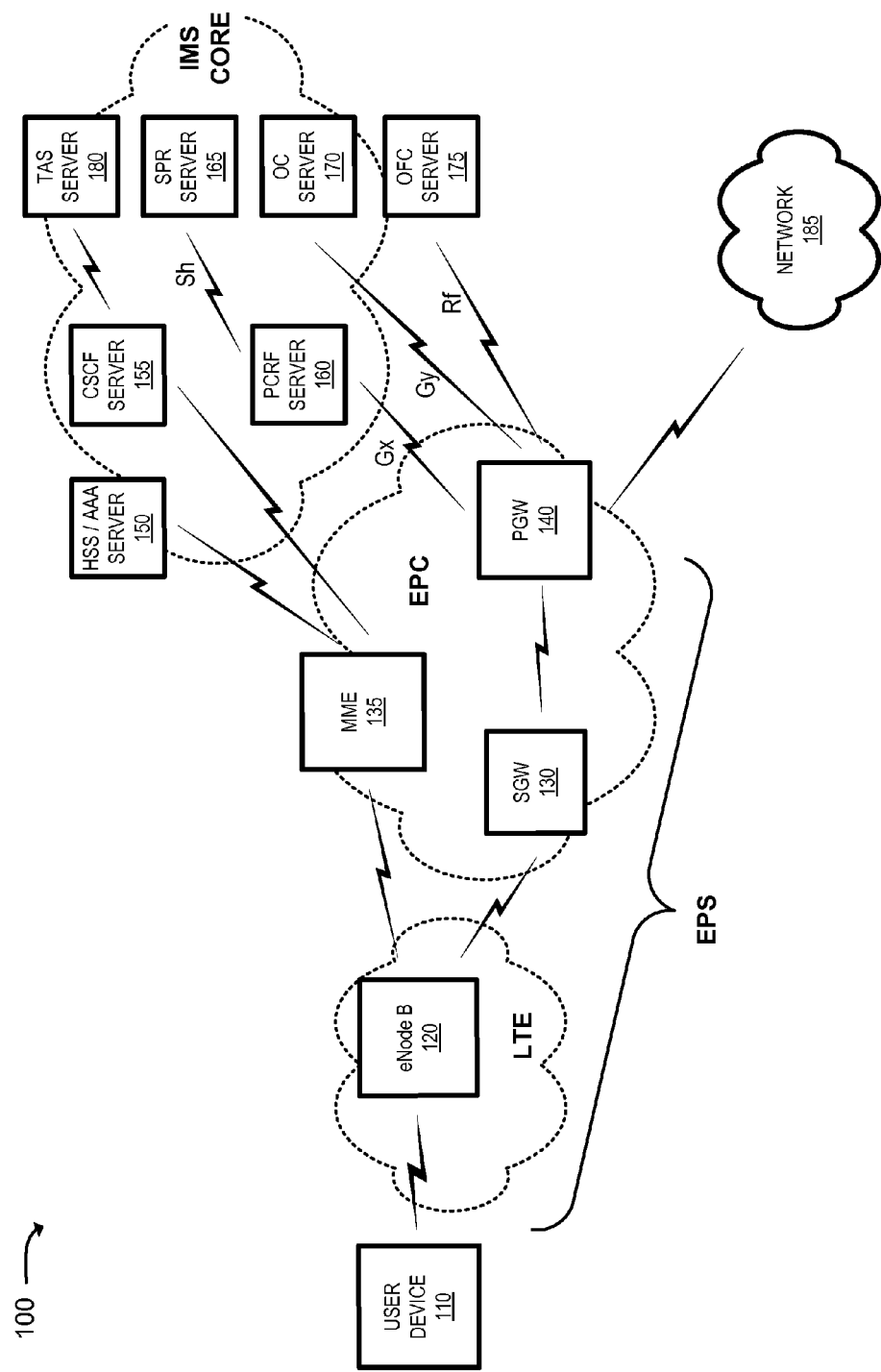
FIG. 1 is a diagram of an example environment in which systems and/or methods described herein may be implemented.

The following detailed description refers to the accompanying drawings. The same reference numbers in different drawings may identify the same or similar elements.

A system and/or method, described herein, may enable a policy control rules function (PCRF) server to obtain a subscriber profile, associated with a user of a user device, when the PCRF server receives an indication that a communication session, associated with the user device, is being established. The system and/or method may allow the PCRF server to identify one or more types of services to which the user device has subscribed (e.g., a postpaid data service, a postpaid voice service, a prepaid data service, a prepaid voice over Internet service, etc.) based on the subscriber profile.

The system and/or method may allow the PCRF server to use the subscriber profile to generate policy control and charging (PCC) rules that specify a type of charging action to be performed, with respect to a type of service associated with the communication session. The system and/or method may allow the PCRF server to generate PCC rules specifying that an offline charging action is to be performed when a first type of service is associated with the communication session. The offline charging action is provided when a packet data network (PDN) gateway (PGW) device, based on the PCC rules, establishes a communication with an offline charging server to perform the offline charging action.

The system and/or method may allow the PCRF server to generate PCC rules specifying that an online charging action is to be performed when a second type of service is associated with the communication session. The online charging action is provided when a PGW device, based on the PCC rules, establishes a communication with an online charging server to perform the online charging action. The system and/or method may allow the PCRF server to generate PCC rules specifying that neither an offline nor online charging action (e.g., a null charging action) is to be performed when a third type of service is associated with the communication session. When the null operation is performed, the PGW device does not establish a communication with the online charging server or offline charging server based on the PCC rules.

The system and/or method may allow the PCRF server to use the subscriber profile to identify other types of services (e.g., a voice of Internet protocol (VoIP) service, a real time reporting (RTR) service, a usage control (UC) service, etc.), to which the user has subscribed, that are to be provided when the communication session is established. The system and/or method may allow the PCRF server to generate other PCC rules that specify a type of charging action (e.g., online, offline, and/or null) to be performed, with respect to the other types of services associated with the communication session.

The system and/or method may allow the PCRF server to generate other PCC rules that do not specify an online or offline charging action when a particular service (e.g., a VoIP service and/or other service) is associated with a communication session. By not performing the online or offline charging actions, network resources and operating costs may be saved because the communications with the online or offline charging services are not established.

FIG. 1 is a diagram of an example environment 100 in which systems and/or methods described herein may be implemented. As shown in FIG. 1, environment 100 may include a user device 110, an e-Node B 120 (hereinafter referred to as an "eNB 120"), a serving gateway device 130 (hereinafter referred to as a "SGW 130"), a mobility management entity device 135 (hereinafter referred to as "MME 135"), a packet data network (PDN) gateway device 140 (hereinafter referred to as a "PGW 140"), a home subscriber server (HSS)/authentication authorization accounting server 150 (hereinafter referred to as a "HSS/AAA server 150"), a call session control function (CSCF) server 155 (hereinafter referred to as a "CSCF server 155"), a policy and charging rules function (PCRF) server 160, a subscriber profile repository (SPR) server 165, an online charging (OC) server 170, an offline charging (OFC) server 175, a telephony application server (TAS) server 180, and a network 185. The number of devices and/or networks, illustrated in FIG. 1, is provided for explanatory purposes only. In practice, there may be additional devices and/or networks; fewer devices and/or networks; different devices networks; or differently arranged devices and/or networks than illustrated in FIG. 1.

Also, in some implementations, one or more of the devices of environment 100 may perform one or more functions described as being performed by another one or more of the devices of environment 100. Further, PCRF server 160, SPR server 165, OC server 170, and/or OFC server 175 may be integrated into a single device. Devices of environment 100 may interconnect via wired connections, wireless connections, or a combination of wired and wireless connections.

Environment 100 may correspond to an evolved packet system (EPS) that includes a long term evolution (LTE) network and/or an evolved packet core (EPC) that operate based on a third generation partnership project (3GPP) wireless communication standard. The LTE network may be a radio access network (RAN) that includes one or more eNBs 120 via which user device 110 communicates with the EPC and/or other user devices 110. The EPC may include SGW 130, MME 135, and/or PGW 140 that enables user device 110 to communicate with network 185, other user devices 110, and/or an Internet protocol (IP) multimedia subsystem (IMS) core. The IMS core may include HSS/AAA server 150, CSCF server 155, PCRF server 160, SPR server 165, OC server 170, and/or OFC server 175 and may manage authentication, security and/or protection protocols, session initiation protocols, account information, network policy enforcement, subscriber profile information, etc. associated with user device 110.

User device 110 may include any computation or communication device, such as a wireless mobile communication device that is capable of communicating with eNB 120 and/or a network (e.g., network 185). For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of mobile computation or communication device. In one example, user device 110 may send traffic to and/or receive traffic from the EPS. In another example, user device 110 may place calls to other user devices 110 and/or receive calls from other user devices 110 via the EPS.

eNB 120 may include one or more devices that receive, process, and/or transmit traffic, such as voice, video, text, and/or other data, destined for and/or received from user device 110. One or more eNBs 120 may be associated with the LTE network that receives traffic from and/or sends traffic to network 185 and/or the IMS core via the EPC. eNB 120 may send traffic to and/or receive traffic from user device 110 via an air interface (e.g., via an LTE-Uu interface).

SGW 130 may include one or more devices, or other types of computation or communication devices, that gather, process, search, store, and/or provide information in a manner described herein. SGW 130 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 130 may, for example, aggregate traffic received from one or more eNBs 120 and may send the aggregated traffic to network 185 (e.g., via PGW 140) and/or other devices associated with the IMS core and/or the EPC. SGW 130 may also receive traffic from the other network devices and/or may send the received traffic to user device 110 via eNB 120. For example, SGW 130 may receive an instruction (e.g., as a result of a registration operation, handoff operation, and/or some other operation) from MME 135 to establish a connection (e.g., a tunnel) that permits user device 110 to communicate with other user devices 110 and/or network devices associated with the LTE, EPC, the IMS core, and/or network 185.

MME 135 may include one or more devices, or other types of computation or communication devices, that gather, process, search, store, and/or provide information in a manner described herein. For example, MME 135 may perform operations associated with a handoff to and/or from the EPS. MME 135 may perform operations to register user device 110 with the EPS, to handoff user device 110 from the EPS to another network, to handoff a user device 110 from the other network to the EPS, and/or to perform other operations. MME 135 may perform policing operations on traffic destined for and/or received from user device 110.

PGW 140 may include one or more devices, or other types of computation or communication devices, that gather, process, search, store, and/or provide information in a manner similar to that described herein. PGW 140 may include one or more data processing and/or traffic transfer devices, such as a gateway, a router, a modem, a switch, a firewall, a NIC, a hub, a bridge, a proxy server, an OADM, or some other type of device that processes and/or transfers traffic. In one example implementation, PGW 140 may include a device that aggregates traffic received from one or more SGWs 130 and may send the aggregated traffic to network 185 and/or the IMS core (e.g., PCRF server 160, CSCF server 155, etc.). In another example implementation, PGW 140 may receive traffic from network 185 and may send the traffic to user device 110 via SGW 130 and/or eNB 120. PGW 140 may perform policing operations on traffic destined for the EPS.

PGW 140 may receive, from PCRF server 150 and via a particular interface (e.g., a Gx interface) PCC rules that govern a manner in which a communication session, associated with user device 110, is to be performed. For example, PGW 140 may communicate with OC server 170 (e.g., via a Gy interface) to monitor the communication session and/or to provide near real-time billing based on an amount of data and/or bandwidth used (e.g., sometimes referred to as megabyte (MB) usage), when the PCC rules include an online charging action. Additionally, or alternatively, PGW 140 may communicate with OFC server 175 (e.g., via a Rf interface) to provide billing based on a period of time (e.g., on a per-monthly basis, etc.), when the PCC rules include an offline charging action.

PGW 140 may, when an RTR service is enabled, receive usage information from OC server 170. PGW 140 may throttle bandwidth usage and/or terminate the communication session when the usage information indicates that a quota, that has been subscribed to by a user of user device 110, has been reached. PGW 140 may, also, or alternatively, throttle and/or terminate a session based on an instruction from OC server 170 when a UC service has been enabled. PGW 140 may also, or alternatively, transmit an instruction, to eNB 120 and/or SGW 130 to throttle and/or terminate the session.

HSS 150 may include one or more server devices, or other types of computation or communication devices, that gather, process, search, store, and/or provide information in a manner described herein. For example, HSS 150 may manage, update, and/or store, in a memory associated with HSS 150, service profile information associated with user device 110. The service profile information may identify services (e.g., names of services, access point names (APNs), packet data networks (PDNs), etc.) that are subscribed to and/or accessible by user device 110; information associated with a user of user device 110 (e.g., a username, a password, a personal identification number (PIN), etc.); rate information; minutes allowed; a quantity of data usage (e.g., MB usage) allowed; and/or other information. Additionally, or alternatively, HSS 150 may include a device that performs authentication, authorization, and/or accounting (AAA) operations associated with a call session with user device 110. HSS server 150 may receive, from MME device 140, an indication that user device 110 is attempting to establish a call session with the EPC and may identify via which CSCF server 155 the session is to be initiated.

CSCF server 155 may include one or more server devices, or other types of computation or communication devices, that gather, process, search, store, and/or provide information in a manner described herein. In one example implementation, CSCF server 155 may execute a session initiation protocol (SIP) associated with establishing a call session with user device 110. In another example implementation, CSCF server 155 may be a serving-CSCF server. CSCF server 155 may communicate via network 185 and may process and/or route calls to and/or from user device 110. CSCF server 155 may, for example, route a call received from user device 110 (e.g., via eNB 120) and may route the call to a destination device.

CSCF server 155 may communicate with TAS server 180 to perform operations associated with monitoring minutes of use and/or providing billing information with respect to a communication session associated with a voice service when neither an online nor offline charging action is to be performed (e.g., a null charging action).

PCRF server 160 may include one or more server devices, or other types of computation or communication devices, that gather, process, search, store, and/or provide information in a manner described herein. In one example implementation, PCRF server 160 may perform operations that enforce EPS policies associated with a call session with user device 110. For example, PCRF server 160 may communicate, with SPR server 165 and via a first interface (e.g., an Sh interface), to obtain a subscriber profile that identifies services (e.g., a prepaid voice service, a prepaid data service, a postpaid voice service, a postpaid data service, a prepaid VoIP service, etc.) to which a user, associated with user device 110, has subscribed. The subscriber profile may also identify particular services (e.g., an RTR service, a UC service, etc.), to which the user has subscribed, that are to be provided when an online charging action is to be performed. PCRF server 160 may use the subscriber profile to generate a charging indicator on which PCC rules, to be applied to the communication session, based. The charging indicator may include one or more flags, associated with charging actions, that are triggered depending on which services the user has subscribed. The PCC rules may include a charging indicator to identify a charging action to be performed (e.g., an online, an offline, and/or a null charging action) and/or services, associated with a charging action, that are to be provided. The PCC rules may also identify a quantity of bandwidth for use to establish the session, a quality of service (QoS) associated with the session, etc.

PCRF server 160 may transmit, to PGW 140 and via a second interface (e.g., a Gx interface), the PCC rules for each bearer, within the EPS, that is set up to transport traffic associated with the session. The PCC rules may include an instruction for PGW 140 to establish a communication, with OC server 170 and via a third interface (e.g., a Gy interface), when the charging indicator indicates that an online charging action is to be performed. Additionally, or alternatively, the PCC rules may include an instruction for PGW 140 to establish a communication, via a fourth interface (e.g., a Rf interface), with OFC server 175 when the charging indicator indicates that an offline charging action is to be performed. Additionally, or alternatively, the PCC rules may not include an instruction for PGW 140 to establish a communication with OC server 175 or OFC server 175 when the charging indicator indicates that neither an online nor an offline charging action is to be performed. In this example, PCRF server 160 may transmit an instruction to CSCF server 155 to monitor the session and/or to provide billing based on minutes of use (MoU).

SPR server 165 may include one or more server devices, or other types of computation or communication devices, that gather, process, search, store, and/or provide information in a manner described herein. In one example implementation, SPR server 165 may obtain and/or store a subscriber profile, associated with user device 110, to be used, by PCRF server 160, to generate PCC rules to govern a communication session associated with user device 110. SPR server 165 may communicate with HSS/AAA server 150 to identify one or more applications (e.g., based on names of applications, APNs, PDNs, etc.) to which a user, of user device 110, has subscribed. Additionally, or alternatively, SPR server 165 may communicate with HSS/AAA server 150 to identify one or more services and/or billing plans (e.g., a prepaid voice and/or data plan, a postpaid voice and/or data plan, a VoIP plan, etc.). SPR server 165 may also, or alternatively, identify whether the user has subscribed to a RTR service, a UC service, etc. Based on the identification of the applications and/or services, associated with the user device, SPR server 165 may generate a subscriber profile associated with user device 110.

OC server 170 may include one or more server devices, or other types of computation or communication devices, that gather, process, search, store, and/or provide information in a manner described herein. In one example implementation, OC server 170 may perform online charging operations. OC server 170 may, for example, monitor traffic associated with a communication session and may track MB usage associated with the session. OC server 170 may provide a RTR service by providing near real-time billing information, to PGW 140 and/or PCRF server 160, based on the MB usage. OC server 170 may also provide a UC service by providing a notification, to PGW 140 and/or PCRF server 160, when a data threshold has been reached based on the MB usage.

OFC server 175 may include one or more server devices, or other types of computation or communication devices, that gather, process, search, store, and/or provide information in a manner described herein. In one example implementation, OFC server 175 may perform offline charging operations. OFC server 175 may, for example, monitor traffic associated with a communication session and may track MB usage and/or MoU associated with the session. OFC server 175 may provide billing information, to PGW 140 and/or PCRF server 160, after a period of time (e.g., on a per-month basis).

TAS server 180 may include one or more server devices, or other types of computation or communication devices, that gather, process, search, store, and/or provide information in a manner described herein. In one example implementation, TAS server 180 may perform charging operations that are not associated with an online charging action or an offline charging action. TAS server 180 may, for example, monitor traffic, associated with a communication session, and may track a period of time associated with the communication session and/or during which traffic is being transported while the communication session is established. TAS server 180 may monitor the traffic and/or track the period of time based on a MoU scheme. TAS server 180 may also provide a notification, to CSCF server 155 and/or PCRF server 160, when a quantity of minutes used is greater than a threshold.

Network 185 may include one or more wired and/or wireless networks. For example, network 185 may include a cellular network, a public land mobile network (PLMN), a second generation (2G) network, a third generation (3G) network, a fourth generation (4G) network, a fifth generation (5G) network, and/or another network. Additionally, or alternatively, network 185 may include a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks. Network 185 may transport traffic to and/or from the EPS (e.g., via PGW 140) and/or another network.

Figure 2:
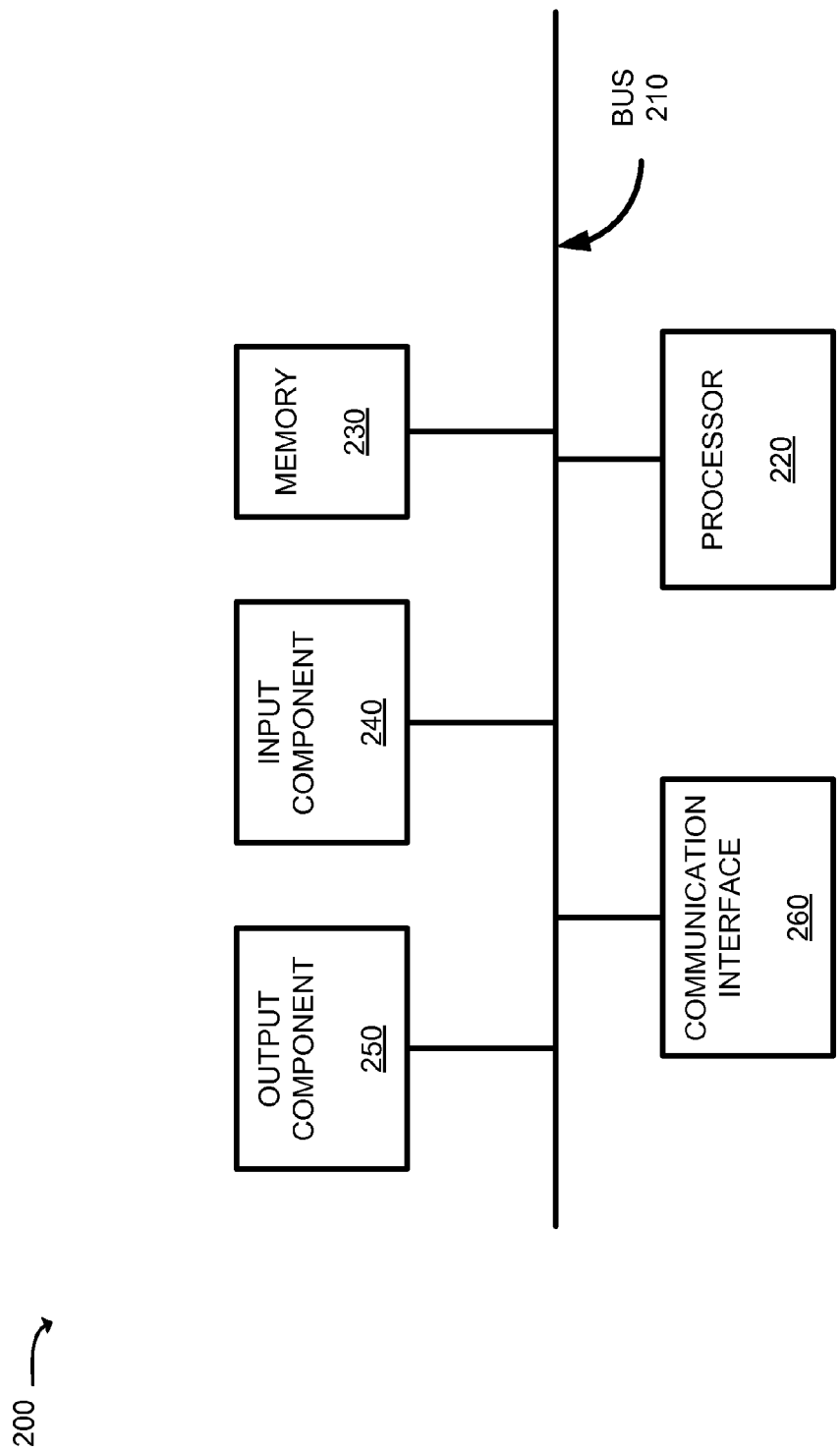
FIG. 2 is a diagram of example components of one or more devices of FIG. 1.

FIG. 2 is a diagram of example components of a device 200. Device 200 may correspond to user device 110, MME 135, HSS/AAA server 150, CSCF server 155, PCRF server 160, SPR server 165, OC server 170, and/or OFC server 175. Alternatively, or additionally, each of user device 110, MME 135, HSS/AAA server 150, CSCF server 155, PCRF server 160, SPR server 165, OC server 170, OFC server 175, and/or TAS 180 may include one or more devices 200.

Device 200 may include a bus 210, a processor 220, a memory 230, an input component 240, an output component 250, and a communication interface 260. Although FIG. 2 shows example components of device 200, in other implementations, device 200 may contain fewer components, additional components, different components, or differently arranged components than depicted in FIG. 2. For example, device 200 may include one or more switch fabrics instead of, or in addition to, bus 210. Additionally, or alternatively, one or more components of device 200 may perform one or more tasks described as being performed by one or more other components of device 200.

Bus 210 may include a path, or collection of paths, that permits communication among the components of device 200. Processor 220 may include a processor, microprocessor, or processing logic that may interpret and execute instructions. Memory 230 may include any type of dynamic storage device that may store information and instructions, for execution by processor 220, and/or any type of non-volatile storage device that may store information for use by processor 220.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc. Communication interface 260 may include any transceiver-like mechanism that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 260 may include mechanisms for communicating with another device or system via a network, such as network 185. In one alternative implementation, communication interface 260 may be a logical component that includes input and output ports, input and output systems, and/or other input and output components that facilitate the transmission of data to other devices.

As described herein, device 200 may perform certain operations relating to offline, online, and/or null charging operations. Device 200 may perform these operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
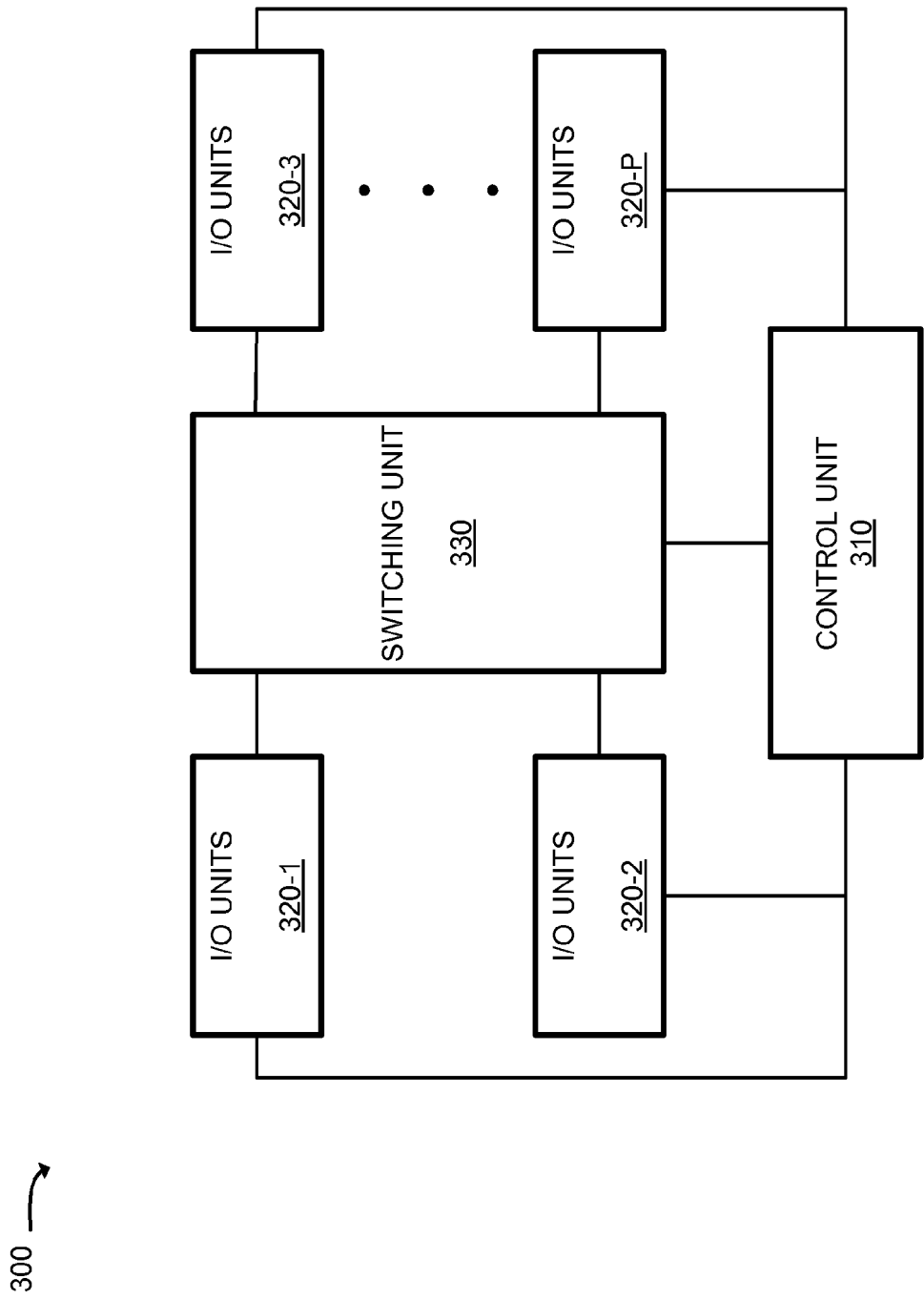
FIG. 3 is a diagram of example components of one or more devices of FIG. 1.

FIG. 3 is a diagram of example components of device 300 that may correspond to one or more of eNB 120, SGW 130, and/or PGW 140. Alternatively, or additionally, eNB 120, SGW 130, and/or PGW 140 may include one or more devices 300. Although, FIG. 3 illustrates example components of device 300, in other implementations, device 300 may include additional components, fewer components, different components, or differently arranged components than those illustrated in FIG. 3 and described herein. Additionally, or alternatively, one or more operations described as being performed by a particular component of device 300 may be performed by one or more other components, in addition to or instead of the particular component of device 300.

Device 300 may receive network traffic, as one or more packet stream(s), from physical links, may process the packet stream(s) to determine destination information, and may transmit the packet stream(s) out on links in accordance with the destination information. Device 300 may include a control unit 310, a set of input/output (I/O) units 320-1, . . . , 320-P (where P≥1) (hereinafter referred to collectively as "I/O units 320" and individually as "I/O unit 320"), and a switching unit 330.

Control unit 310 may include a processor, a microprocessor, or some form of hardware logic (e.g., an application specific integrated circuit (ASIC) or a field programmable gate array (FPGA)). In one example implementation, control unit 310 may include an Ethernet controller and/or another controller device. Control unit 310 may perform high level management functions for device 300. For example, control unit 310 may maintain the connectivity and manage information/data necessary for transferring packets by device 300. Control unit 310 may create routing tables based on network topology information, create forwarding tables based on the routing tables, and communicate the forwarding tables to I/O units 320. I/O units 320 may use the forwarding tables to perform route lookup for incoming packets and perform the forwarding functions for device 300. Control unit 310 may also perform other general control and monitoring functions for device 300.

I/O unit 320 may include a component or collection of components to receive incoming packets, to process incoming and/or outgoing packets, and/or to transmit outgoing packets. For example, I/O unit 320 may include I/O ports, a packet forwarding component (PFC), an Ethernet interface and/or another type of interface, a central processing unit (CPU), and/or a memory device. I/O unit 320 may include a collection of ports that receive or transmit packets via physical links. I/O unit 320 may also include packet processing component(s), switch interface component(s), Internet processor component(s), memory device(s), etc.

Each of I/O units 320 may be connected to control unit 310 and switching unit 330. I/O units 320 may receive packet data on physical links connected to a network (e.g., network 185). Each physical link could be one of many types of transport media, such as an optical fiber or an Ethernet cable.

I/O units 320 may process incoming packet data prior to transmitting the data to another I/O unit 320 or the network. I/O units 320 may perform route lookups for the data using the forwarding table from control unit 310 to determine destination information. If the destination indicates that the data should be sent out on a physical link, connected to I/O unit 320, then I/O unit 320 may prepare the data for transmission by, for example, adding any necessary headers and/or modifying existing headers, and/or transmitting the data from the port associated with the physical link. If the destination indicates that the data should be sent to another I/O unit 320 via switching unit 330, then I/O unit 320 may, if necessary, prepare the data for transmission to the other I/O unit 320 and/or may send the data to the other I/O unit 320 via switching unit 330.

Switching unit 330 may include one or multiple switching planes to facilitate communication among I/O units 320 and/or control unit 310. In one implementation, each of the switching planes may include a single-stage switch or a multi-stage switch of crossbar elements. Switching unit 330 may also, or alternatively, include processors, memories, and/or paths that permit communication among I/O units 320 and/or control unit 310.

As described herein, device 300 may perform certain operations associated with offline, online, and/or null charging operations. Device 300 may perform these operations in response to control unit 310 and/or one or more I/O units 320 executing software instructions contained in a computer-readable medium, such as a memory associated with control unit 310 and/or the one or more I/O units 320. The software instructions may be read into the memory from another computer-readable medium or from another device. The software instructions contained in the memory may cause control unit 310 and/or the one or more I/O units 320 to perform processes described herein. Alternatively, hardwired circuitry may be used in place of or in combination with software instructions to implement processes described herein. Thus, implementations described herein are not limited to any specific combination of hardware circuitry and software.

FIG. 4 is a diagram of an example data structure 400 to store information, associated with a subscriber profile, according to an implementation described herein. In one example implementation, data structure 400 may be stored in a memory associated with PCRF server 160. Data structure 400 may include a collection of fields, such as a user device identifier (ID) field 405, a service type field 410, a real-time reporting (RTR) field 420, a usage control (UC) field 430, a prepaid data field 440, a prepaid voice over Internet protocol (VoIP) field 450, an offline field 460, and a charging action field 470. Although FIG. 4 shows example fields 405-470 of data structure 400, in other implementations, data structure 400 may include fewer fields, different fields, additional fields, or differently arranged fields than depicted in FIG. 4. Additionally, or alternatively, one or more fields of data structure 400 may include information described as being included in one or more other fields of data structure 400.

User device identifier (ID) field 405 may store information associated with a particular user device 110 with which a communication session is associated. The information associated with the particular user device 110 may include a unique identifier (e.g., a mobile directory number (MDN), a landline directory number (LDN)), a network address (e.g., a media access control (MAC) address, an IP address, etc.), information associated with a user of the particular user device 110 (e.g., a username, password, personal identification number (PIN), etc.). Service type field 410 may store information that identifies a type of service (e.g., a prepaid voice and/or data service, a postpaid voice and/or data service, a prepaid VoIP service, etc.) to which the user, of the particular user device 110, has subscribed and/or to which traffic, associated with a communication session, corresponds.

RTR field 420 may store an indication (e.g., a flag) that identifies whether an online RTR service has been subscribed to by the user. For example, the first flag may correspond to a first value (e.g., such as "1" or some other value), a first string (e.g., "yes" or some other string of characters), etc. that indicates that the RTR service has been subscribed to by the user. In another example, a second flag may correspond to a second value (e.g., such as "0" or some other value), a second string (e.g., "no" and/or some other string of characters), etc. that indicates that the RTR service has not been subscribed to by the user. UC field 430 may store an indication (e.g., the first flag or the second flag) that identifies whether an online UC service has been subscribed to by the user. Prepaid data field 440 may store an indication (e.g., the first flag or the second flag) that identifies whether an online charging action is to be performed when a prepaid data service has been subscribed to by the user. Prepaid VoIP field 450 may store an indication (e.g., the first flag or the second flag) that identifies whether an online charging action is to be performed when a prepaid VoIP service has been subscribed to by the user. Offline field 460 may store an indication (e.g., the first flag or the second flag) that identifies whether an offline charging action is to be performed. Charging action field 470 may identify whether an online charging action, an offline charging action, or neither an offline or online charging action (e.g., a null charging action) is to be performed.

PCRF server 160 may communicate with SPR server 165 to identify services to which a user, of a first user device 110, has subscribed and may store, in data structure 400, a subscriber profile, associated with first user device 110. The information, stored in data structure 400, may correspond to one or more charging indicators to be included within PCC rules associated with a communication session.

PCRF server 160 may store information associated with a first user device 110 (e.g., MDN1), and information that identifies a first type of service (e.g., postpaid data) to which a user, of the first user device 110, has subscribed (e.g., as shown by ellipse 474). PCRF server 160 may determine that an online charging service, such as an RTR service, has been subscribed to and may store a first flag (e.g., a "YES" flag) in RTR field 420 (e.g., as shown by ellipse 474). PCRF server 160 may determine that none of the other services, associated with an online charging action, have been subscribed to and may store the second flag (e.g., the "NO" flag) in each of fields 430-450 (e.g., as shown by ellipse 474). PCRF server 160 may determine that the postpaid data service is to be billed based on a time period (e.g., on a per-month basis, etc.). Based on the determination that the postpaid data service is to be billed based on the time period, PCRF server 160 and may store the first flag (e.g., a "YES" flag) in offline field 460 (e.g., as shown by ellipse 474). Based on the determination that the RTR service has been subscribed to and/or that the postpaid data service is to be billed based on the time period, PCRF server 160 may store, in data structure 400, an indication that an offline charging action and/or an online charging action (e.g., offline/online), respectively, are to be performed (e.g., as shown in ellipse 474).

PCRF server 160 may store information associated with a second user device 110 (e.g., MDN2), and information that identifies a second type of service (e.g., postpaid voice) to which a user, of the second user device 110, has subscribed (e.g., as shown by ellipse 476). PCRF server 160 may determine that no services, associated with an online charging action, have been subscribed to and may store the second flag (e.g., the "NO" flag) in each of fields 420-450 (e.g., as shown by ellipse 476). PCRF server 160 may determine that the postpaid voice service is to be billed based a MoU scheme and may store the second flag (e.g., the "NO" flag) in offline field 460 (e.g., as shown by ellipse 476). Based on the determination that the postpaid voice service is to be billed based on a MoU scheme and that none of the services, associated with an online charging action have been subscribed to, PCRF server 160 may store, in data structure 400, an indication (e.g., null) that neither an online nor offline charging action is to be performed (e.g., as shown in ellipse 476).

PCRF server 160 may store information associated with a third user device 110 (e.g., MDN3), and information that identifies a third type of service (e.g., prepaid data) to which a user, of the third user device 110, has subscribed (e.g., as shown by ellipse 478). PCRF server 160 may determine that online charging services, such as a RTR service, a UC service, and/or a prepaid data service have been subscribed to and may store the first flag (e.g., the "YES" flag) in fields 420-440 (e.g., as shown by ellipse 478). PCRF server 160 may determine that another online service, such as a prepaid VoIP service, has not been subscribed to and may store the second flag (e.g., the "NO" flag) in field 450 (e.g., as shown by ellipse 478). PCRF server 160 may determine that the prepaid data service is not to be billed based on a period of time and may store the second flag (e.g., a "NO" flag) in offline field 460 (e.g., as shown by ellipse 478). Based on the determination that the online services have been subscribed to, PCRF server 160 may store, in data structure 400, an indication that an online charging action (e.g., online) is to be performed (e.g., as shown in ellipse 478).

PCRF server 160 may store information associated with a fourth user device 110 (e.g., MDN4), and information that identifies a fourth type of service (e.g., prepaid VoIP) to which a user, of the fourth user device 110, has subscribed (e.g., as shown by ellipse 480). PCRF server 160 may determine that online charging services, such as the RTR service, UC service, and/or the prepaid data service have not been subscribed to and may store a second flag (e.g., a "NO" flag) in fields 420-440 (e.g., as shown by ellipse 480). PCRF server 160 may determine that the prepaid VoIP service has been subscribed to, but is not to be billed on a near-real-time basis (e.g., based on a MB usage scheme). Based on the determination that the prepaid VoIP service is not to be billed on the near-real time basis, PCRF server 160 may store the second flag (e.g., the "NO" flag) in prepaid VoIP field 450. PCRF server 160 may also, or alternatively, determine that the prepaid VoIP service is not to be billed based on a period of time and may store the second flag (e.g., the "NO" flag) in offline field 460 (e.g., as shown by ellipse 480). Based on a determination that the prepaid VoIP service is not to be billed on a near-real time based and that none of the other services, associated with online charging action have been subscribed to, PCRF server 160 may determine that an online charging action is not to be performed. Based on the determination that neither the offline nor the online charging action are to be performed, PCRF server 160 may store, in data structure 400, an indication (e.g., null) that neither an online nor offline charging action is to be performed (e.g., as shown in ellipse 480).

Figure 5:
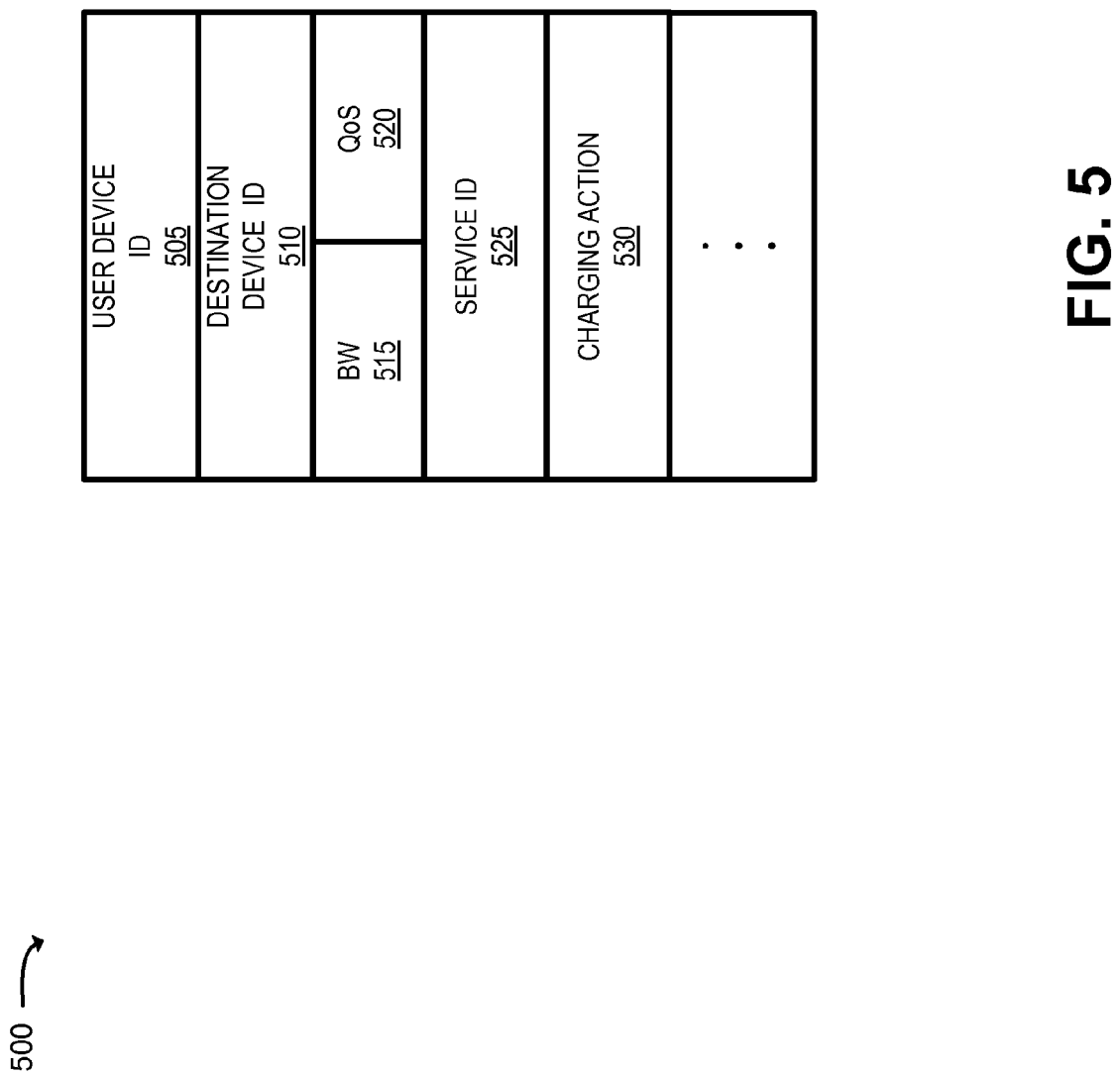
FIG. 5 is a diagram of an example data structure to store policy control and charging rules according to an implementation described herein.

FIG. 5 is a diagram of an example data structure 500 to store policy control and charging rules according to an implementation described herein. In one example implementation, data structure 500 may be stored in a memory associated with PCRF server 160. Data structure 500 may include a collection of fields, such as a user device identifier (ID) field 505, a destination device ID field 510, a bandwidth (BW) field 515, a quality of service (QoS) field 520, a service ID field 525, and a charging action field 530.

Although FIG. 5 shows example fields 505-530 of data structure 500, in other implementations, data structure 500 may include fewer fields, different fields, additional fields, or differently arranged fields than depicted in FIG. 5. Additionally, or alternatively, one or more fields of data structure 500 may include information described as being included in one or more other fields of data structure 500.

User device ID field 505 may store information associated with a particular user device 110 for which a communication session has been established. The information associated with the particular user device 110 may include a unique identifier (e.g., a MDN, a LDN, etc.), a network address (e.g., a MAC address, an IP address, etc.), information associated with a user of the particular user device 110 (e.g., a username, password, PIN, etc.), etc. Destination device ID field 510 may store information associated with a destination device with which the particular user device 110 is communicating as a result of establishing the communication session. The information associated with the destination device may include a unique device identifier (e.g., a MDN, a LDN, etc.), a network address (e.g., a MAC address, an IP address, etc.), etc.

BW field 515 may store information associated with a maximum quantity of bandwidth that can be used to transport traffic associated with the communication session. QoS field 520 may store information associated with a level of QoS associated with traffic that is being transported as a result of the communications session. The level of QoS may identify a priority with which the traffic is to be processed by PGW 140. Additionally, or alternatively, the level of QoS may identify a maximum quantity of dropped, delayed, and/or mis-ordered packets, associated with the traffic, that is to be permitted when processing the traffic associated with the communication session. Additionally, or alternatively, the level of QoS may identify a maximum quantity of jitter that is to be permitted when processing the traffic.

Service ID field 525 may identify one or more types of services (e.g., prepaid data and/or voice service, a postpaid data and/or voice service, a prepaid VoIP service, etc.) with which the communication session is associated and/or that are to be provided when executing the communication session (e.g., the RTR service, UC service, etc.). The quantity of bandwidth, associated with the communication session as identified in BW field 515, may be specified, by PCRF 160, based on the identified types of services.

Charging action field 530 may identify whether the charging action, associated with the communication session is an online charging action, an offline charging action, or neither an online nor offline charging action (e.g., null charging action). PCRF server 160 may, for example, store an indication that an online charging action is to be performed when information, associated with the subscriber profile (e.g., that is stored in data structure 400 of FIG. 4), indicates that the online charging action is associated with one or more services to which the user, of the particular user device 110, has subscribed. The indication may identify an interface (e.g., a Gy interface) that is to be used to communicate with OC server 170 to perform the online charging action.

PCRF server 160 may also, or alternatively, store an indication that an offline charging action is to be performed when the information, associated with the subscriber profile, indicates that the offline charging action is associated with one or more services to which the user has subscribed. The indication may identify an interface (e.g., a Rf interface) that is to be used to communicate with OFC server 175 to perform the offline charging action.

PCRF server 160 may, in another example, store an indication that neither the online nor the offline charging action is to be performed when the information, associated with the subscriber profile, indicates that neither the online nor the offline charging action is associated with one or more services to which the user has subscribed.

Figure 6:
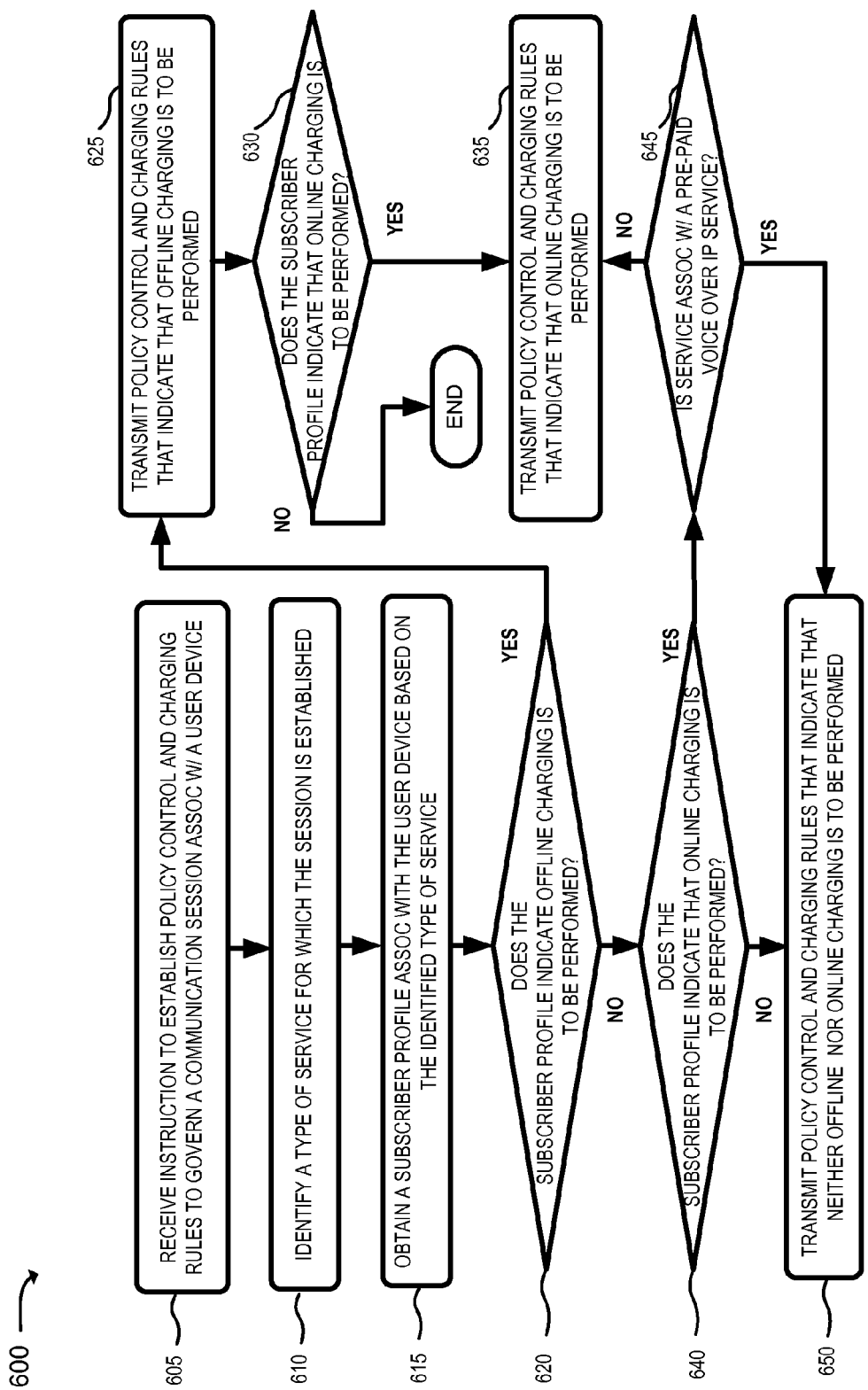
FIG. 6 is a flow chart of an example process for generating policy control and charging rules, associated with a communication session, according to an implementation described herein.

FIG. 6 is a flow chart of an example process 600 for generating PCC rules associated with a communication session according to an implementation described herein. In one example implementation, process 600 may be performed by PCRF server 160. In another example implementation, some or all of process 600 may be performed by a device or collection of devices separate from, or in combination with, PCRF server 160.

As shown in FIG. 6, process 600 may include receiving an instruction to establish PCC rules to govern a communication session associated with a user device (block 605). For example, CSCF server 155 may receive a request, from user device 110, to establish a communication session (e.g., associated with a call, voice service, a VoIP service, etc.) to permit user device 110 to communicate, via network 185, with a destination device (e.g., such as another user device 110). CSCF server 155 may send, to PCRF server 160, an instruction to establish PCC rules to govern the communication session associated with user device 110.

In another example, MME server 150 may receive a request, from user device 110, to establish a communication session (e.g., associated with a broadband data service, a video streaming service, a messaging service, etc.) to permit user device 110 to communicate, via network 185, with a destination device (e.g., such as a web server, a content provider, etc.). MME server 150 may send, to PCRF server 160, an instruction to establish PCC rules to govern the communication session associated with user device 110 and PCRF server 160 may receive the instruction from CSCF server 155 and/or MME 150.

As also shown in FIG. 6, process 600 may include identifying a type of service for which the communication session is established (block 610) and obtaining a subscriber profile, associated with the user device, based on the identified type of service (block 615). For example, PCRF server 160 may, as a result of receiving the instruction, identify, from the instruction, the type of service with which the communication session is associated. Additionally, or alternatively, PCRF server 160 may identify a PDN to which the type of service corresponds and may identify a PGW 140, that allows access the PDN, to which the PCC rules are to be transmitted.

Additionally, or alternatively, PCRF server 160 may, as a result of receiving the instruction, communicate with SPR server 165 to obtain a subscriber profile associated with user device 110. The subscriber profile may, in a manner similar to that described above with respect data structure 400 of FIG. 4, identify services (e.g., a prepaid voice service, a prepaid data service, a postpaid voice service, a postpaid data service, a prepaid VoIP service, etc.) to which a user, associated with user device 110, has subscribed. The subscriber profile may also identify other services associated with online charging (e.g., a RTR service, a UC service, a prepaid data service, etc.) to which the user has subscribed. PCRF server 160 may determine a type of charging action to be included in the PCC rules based on the type of service associated with the communication session and the services to which the user has subscribed.

As further shown in FIG. 6, if the subscriber profile indicates that offline charging is to be performed (block 620—YES), then process 600 may include transmitting PCC rules that indicate that offline charging is to be performed (block 625). For example, PCRF server 160 may determine that a type of service, associated with the communication session, corresponds to a service to which the user, of user device 110, has subscribed based on the subscriber profile. PCRF server 160 may also, or alternatively, identify a charging action associated with the communication session based on the subscriber profile. For example, PCRF server 160 may determine that the service corresponds to a postpaid data service. PCRF server 160 may determine, based on the subscriber profile, that an offline charging action is to be performed when the type of traffic is associated with the postpaid data service.

PCRF server 160 may generate PCC rules, associated with the communication session that include an instruction to perform the offline charging action. The instruction may identify a fourth interface (e.g., a Rf interface) that is to be used, by PGW 140, to establish a communication with OFC server 175 to perform the offline charging action. Additionally, or alternatively, PCRF server 160 may identify a maximum quantity of bandwidth and/or a level of QoS that is to be enforced during the communication session based on the postpaid data service.

PCRF 160 may transmit the PCC rules to PGW 140. The PCC rules may include the instruction to perform the offline charging action and/or an indication that the fourth interface is to be used. The PCC rules may also, or alternatively, identify the maximum quantity of bandwidth and/or the level of QoS that is to be enforced during the communication session. PGW 140 may receive the instruction and may establish a connection with OFC server 175 via the fourth interface, which may cause OFC server 175 to perform the offline charging action. PGW 140 may process traffic, associated with the communication session, based on the maximum quantity of bandwidth and/or the level of QoS identified in the PCC rules.

As yet further shown in FIG. 6, if the subscriber profile indicates that online charging is not to be performed (block 630—NO), then process 600 may end. For example, PCRF server 160 may determine, based on the subscriber profile, an online charging action is not to be performed on a service associated with the communication session. Based on the determination that the online charging action is not to be performed, PCRF server 160 may not generate PCC rules that include an instruction to perform an online charging action and/or process 600 may end.

As still further shown in FIG. 6, if the subscriber profile indicates that online charging is to be performed (block 630—YES), then process 600 may include transmitting PCC rules that indicate that online charging is to be performed (block 635). For example, PCRF server 160 may determine, based on the subscriber profile, that a service, associated with the communication session, is associated with an online charging action. PCRF server 160 may, for example, determine that a RTR service is to be performed when the type of service, associated with communication session, corresponds to the postpaid data service. PCRF server 160 may also, or alternatively, determine that the subscriber profile indicates that an online charging action is to be performed when the RTR service is to be performed.

Based on the determination that the online charging action is to be performed, PCRF server 160 may generate PCC rules, associated with the communication session, that include an instruction to perform the online charging action and/or to provide the RTR service. The instruction may identify a third interface (e.g., a Gy interface) that is to be used, by PGW 140, to establish a communication with OC server 170 to perform the online charging action and/or to provide the RTR service. Additionally, or alternatively, PCRF server 160 may identify a maximum quantity of bandwidth and/or a level of QoS that is to be enforced during the communication session based on the postpaid data service associated with the communication session.

PCRF 160 may transmit the PCC rules to PGW 140. The PCC rules may include the instruction to perform the online charging action and/or to provide the RTR service, and/or an indication that the third interface is to be used. The PCC rules may also, or alternatively, identify the maximum quantity of bandwidth and/or the level of QoS that is to be enforced during the communication session. PGW 140 may receive the instruction and may establish a connection, with OC server 170 and via the third interface, which may cause OC server 170 to perform near real-time monitoring of traffic, associated with the communication session, using a MB usage scheme. OC server 170 may perform the RTR service by providing updates, to PGW 140, that identify a quantity of data and/or bandwidth (e.g., based on the MB usage scheme) that is being used during the communication session. PGW 140 may process traffic, associated with the communication session, based on the maximum quantity of bandwidth and/or the level of QoS identified in the PCC rules. PGW 140 may also, or alternatively, transmit a notification, to user device 110, that indicates a quantity of data and/or bandwidth that is being used, during the communication session, as a result of the RTR service being performed.

As also shown in FIG. 6, if the subscriber profile indicates that offline charging is not to be performed (block 620—NO), that online charging is to be performed (block 640—YES), and the service is not associated with a prepaid VoIP service (block 645—NO), then process 600 may include transmitting PCC rules that indicate that online charging is to be performed (block 635). For example, PCRF server 160 may determine, based on the subscriber profile, that a service associated with the communication session and to which the user, of user device 110, has subscribed is not associated with an offline charging action and is associated with an online charging action. PCRF server 160 may, for example, determine that a type of service, associated with the communication session, corresponds to a prepaid data service. PCRF server 160 may, based on the subscriber profile, determine that an online charging action is to be performed when the type of service, associated with communication session, corresponds to the prepaid data service. PCRF server 160 may also, or alternatively, determine that the subscriber profile indicates that a RTR service and/or an UC service is to be provided when the prepaid data service is associated with communication session. PCRF server 160 may generate PCC rules that include an instruction to perform an online charging action based on a determination that the service, associated with the communication session, does not correspond to the prepaid VoIP service.

PCRF server 160 may, for example, generate PCC rules, in a manner similar to that described above with respect to block 635, that instruct PGW 140 to communicate with OC server 170, via the third interface, to cause the online charging action to be performed. Additionally, or alternatively, the instruction may include an indication that the RTR service and/or the UC service is to be performed. PCRF server 160 may also, or alternatively, identify a maximum quantity of bandwidth and/or a level of QoS that is to be enforced during the communication session based on the postpaid voice service and/or the prepaid data service associated with the communication session.

PCRF 160 may, in a manner similar to that described above with respect to block 635, transmit the PCC rules to PGW 140. PGW 140 may receive the instruction and may establish a connection, with OC server 170 and via the third interface, which may cause OC server 170 to perform near real-time monitoring of traffic, associated with the communication session, using an MB usage scheme. The PCC rules may include an indication that the RTR service and/or the UC service is to be performed. PGW 140 may, in this example, instruct OC server 170 to provide the RTR service in the manner similar to that described above with respect to block 635. PGW 140 may transmit a notification, to user device 110, that indicates a quantity of data that is being used, during the communication session, as a result of the RTR service being performed.

Additionally, or alternatively, PGW 140 may perform a usage control service that throttles bandwidth utilization and/or a data rate associated with traffic that is being transmitted as a result of the communication session. PGW 140 may, for example, reduce a quantity of bandwidth and/or a data rate, associated with the traffic, when OC server 170 indicates that the bandwidth and/or data rate has reached a threshold. PGW 140 may, in another example, terminate the communication session or instruct other signal bearers (e.g., SGW 130, eNB 120, etc.) to terminate the communication session when OC server 170 indicates that the bandwidth and/or data rate has reached another threshold.

As further shown in FIG. 6, if the subscriber profile indicates that online charging is not to be performed (block 640—NO) or if the service is associated with the prepaid VoIP service (block 645—YES), then process 600 may include transmitting PCC rules that indicate that neither offline nor online charging is to be performed (block 650). For example, PCRF server 160 may determine that a type of service associated with the communication session is associated with a prepaid VoIP service or a postpaid voice service. PCRF server 160 may, based on the subscriber profile, determine that neither an online charging action nor an offline charging action are to be performed when the type of service, associated with communication session, corresponds to the prepaid VoIP service or the postpaid voice service.

Based on the determination that neither the online nor the offline charging action is to be performed, PCRF server 160 may generate PCC rules, associated with the communication session, that do not include an instruction to perform the online and/or the offline charging action. Additionally, or alternatively, PCRF server 160 may identify a maximum quantity of bandwidth and/or a level of QoS that is to be enforced during the communication session based on the prepaid VoIP service. PCRF 160 may transmit the PCC rules to PGW 140.

PGW 140 may receive the PCC rules and may process traffic, associated with the communication session, based on the maximum quantity of bandwidth and/or the level of QoS identified in the PCC rules.

PCRF 160 may transmit a notification, to CSCF server 155, that indicates that neither an online nor offline charging action is to be performed with respect to the prepaid VoIP traffic associated with communication session. CSCF server 155 may receive the notification and may instruct TAS server 180 to track usage, based on a MoU scheme. In another example implementation, PCRF 160 may transmit the notification directly to TAS server 180 instead of, or in addition to, CSCF server 155.

TAS server 180 may transmit a notification, to CSCF server 155, that indicates when a quantity of minutes, associated with the communication session and/or previous communication sessions, associated with user device 110, is greater than a threshold. CSCF server 155 may receive the notification, from TAS server 180, and may instruct PCRF server 160 to terminate the communication session. PCRF server 160 may receive the instruction to terminate the session and may transmit, to PGW 140, an instruction to terminate the session. PCRF server 160 may also, or alternatively, delete the PCC rules associated with the session. PGW 140 may receive the instruction and may terminate the communication session and/or may transmit, to other signal bearers (e.g., SGW 130, eNB 120, etc.), instructions to terminate the session.

A system and/or method, described herein, may enable a PCRF server to obtain a subscriber profile, associated with a user of a user device, when the PCRF server receives an indication that a communication session is being established. The system and/or method may allow the PCRF server to identify one or more types of services, to which the user device has subscribed, based on the subscriber profile.

The system and/or method may allow the PCRF server to use the subscriber profile to generate policy control and charging (PCC) rules that specify a type of charging action (e.g., an online, offline, or null charging action) to be performed based on a type of service associated with the communication session.

The system and/or method may allow the PCRF server to use the subscriber profile to identify other types of services (e.g., a VoIP service, a RTR service, a UC service, etc.), to which the user has subscribed, that are to be provided when the communication session is established. The system and/or method may allow the PCRF server to generate other PCC rules that specify a type of charging action to be performed with respect to the other types of services.

The system and/or method may allow the PCRF server to generate other PCC rules that do not specify an online or offline charging action when a VoIP service and/or postpaid voice service is associated with a communication session. By not performing the online or offline charging actions, network resources and operating costs may be saved because the communications with the online or offline charging services are not established by a PGW device.

The foregoing description provides illustration and description, but is not intended to be exhaustive or to limit the implementations to the precise form disclosed. Modifications and variations are possible in light of the above disclosure or may be acquired from practice of the embodiments.

While a series of blocks has been described with regard to FIG. 6, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

The term "packet" as used herein, may refer to a datagram, a data item, or a cell; a fragment of a packet, a fragment of a datagram, a fragment of a data item, a fragment of a cell; or another type, arrangement, or packaging of data.

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    receiving, by a server device in an Internet protocol (IP) multimedia subsystem (IMS) core, an indication that a session, associated with a user device, is to be established;
    obtaining, by the server device and in response to receiving the indication, a subscriber profile, associated with the user device, that identifies one or more services to which a user, of the user device, has subscribed;
    determining, by the server device and based on the subscriber profile, that a service, associated with the session, corresponds to one of the one or more services, where the subscriber profile identifies one or more charging actions that correspond to the service;
    instructing a first device to initiate an online charging action, of the one or more charging actions, when the server device determines that the service corresponds to a first type of service;
    instructing a second device to initiate an offline charging action, of the one or more charging actions, when the server device determines that the service corresponds to a second type of service; and
    instructing a third device to not initiate the online charging action or the offline charging action when the server device determines that the service corresponds to a third type of service, wherein the third type of service is different from the first type of service and the second type of service.

2. The method of claim 1, where the third type of service corresponds to at least a prepaid voice over IP (VoIP) service.

3. The method of claim 1, further comprising:
instructing another server device, associated with the IMS core, to identify a quantity of time associated with the session when the service corresponds to a third type of service, where the quantity of time is used to generate a bill for the session.

4. The method of claim 1, where instructing the first device to initiate the online charging action further includes:
instructing the first device to establish a communication with another server device, associated with the IMS core, to perform the online charging action, where instructing the first device to establish the communication with the other server device identifies a particular interface via which the communication is to be established.

5. The method of claim 1, where instructing the second device to initiate the offline charging action further includes:
instructing the second device to establish a communication with another server device, associated with the IMS core, to perform the offline charging action, where instructing the second device to establish the communication with the other server device identifies a particular interface via which the communication is to be established.

6. The method of claim 1, further comprising:
determining, from the subscriber profile, that another service is to be provided when the service corresponds to the first type of service or the second type of service; and
instructing the second device to initiate the other service based on the determination that the other service is to be provided.

7. The method of claim 6, where the other service includes at least one of:
a real-time reporting (RTR) service that identifies a quantity of bandwidth or data used during the session, or
a usage control (UC) service that causes the second device to decrease available bandwidth or a data rate, associated with the session, when the quantity of bandwidth or data used during the session is greater than a threshold.

8. The method of claim 1, where the first type of service corresponds to a postpaid data service or a prepaid data service,
where the second type of service corresponds to at least the postpaid data service, and
where the third type of service corresponds to a prepaid voice over Internet protocol (VoIP) service or a postpaid voice service.

9. The method of claim 1, where instructing the first device to initiate the online charging action causes the user device to be billed on a near real-time basis, based on a quantity of data that is transported, or bandwidth that is used, during the session; and
where instructing the second device to initiate the offline charging action causes the user device to be billed after a period of time, based on a quantity of data that is transported, or bandwidth that is used, during the period of time.

10. A device, in an Internet protocol (IP) multimedia subsystem (IMS) core, the device comprising:
a memory to store a subscriber profile that identifies one or more services to which a user, of a user device, has subscribed and a respective charging action to be performed that corresponds each of the one or more services; and
one or more processors to:
receive, from a first device within the IMS core, an instruction to generate policy control and charging (PCC) rules for a session, associated with the user device,
identify, based on the instruction, that a service, associated with the session, corresponds to one of the one or more services identified by the subscriber profile,
generate first PCC rules associated with an online charging action, when the processor identifies that the service corresponds to a first type of service,
generate second PCC rules associated with an offline charging action, when the processor identifies that the service corresponds to a second type of service,
generate third PCC rules that are not associated with the online charging action or the offline charging action when the processor identifies that the service corresponds to a third type of service wherein the third type of service is different from the first type of service and the second type of service, and
transmit, to a second device, at least one of the first PCC rules, the second PCC rules, or the third PCC rules based on whether the service corresponds to the first type of service, the second type of service, or the third type of service,
where the first PCC rules cause the second device to initiate the online charging action,
where the second PCC rules cause the second device to initiate the offline charging action, and
where the third PCC rules does not cause the second device to initiate the online charging action or the offline charging action.

11. The device of claim 10, where the first PCC rules include at least one of:
a first instruction to perform the online charging action,
a second instruction to establish an interface with a third device, associated with the IMS core, that performs online charging operations,
information that identifies a maximum quantity of bandwidth that is permitted for the session, or
information that identifies a level of quality of service (QoS) associated with the session.

12. The device of claim 10, where, when generating the third PCC rules, the one or more processors are further to:
transmit, to the first device, a notification that a period of time, during which the session is established, is to be used to bill the user of the user device.

13. The device of claim 10, where the one or more processors are further to:
determine that the service, associated with the session, corresponds to the first type of service or the second type of service,
identify, from the subscriber profile, that another service is to be performed based on the determination that service corresponds to the first type of service or the second type of service,
generate the first PCC rules that include an instruction to perform the other service when the service corresponds to the first type of service, and
generate the second PCC rules that include the instruction to perform the other service when the service corresponds to the second type of service.

14. The device of claim 13, where the other service corresponds to at least one of:
a real-time reporting (RTR) service that reports, on a near real-time basis, a quantity of bandwidth or data used during the session, or a usage control (UC) service that causes the second device to decrease available bandwidth or a data rate, associated with the session, when the quantity of bandwidth or data, used during the session, is greater than a threshold.

15. The device of claim 13, where the first PCC rules identifies a first interface that is to be used to communicate with a third device, associated with the IMS core, to perform the online charging action,
where the second PCC rules identify a second interface that is to be used to communicate with a fourth device, associated with the IMS core, to perform the offline charging action, and where the second interface is different than the first interface.

16. The device of claim 15, where the first interface corresponds to a Gy interface, and where the second interface corresponds to a Rf interface.

17. The device of claim 10, where the one or more services correspond to:
a postpaid voice service,
a postpaid data service,
a prepaid data service, or
the prepaid voice over Internet protocol (VoIP) service.

18. A system comprising:
a policy and charging rules function (PCRF) device to:
receive a notification that a communication session, associated with a user device, is being established,
obtain, from a first server device and in response to the notification, a subscriber profile that identifies whether a user, of the user device, has subscribed to a service associated with an online charging action or a service associated with an offline charging action based on a type of communication session that is being established,
instruct a packet data network (PDN) gateway (PGW) device to establish a connection with a second server device to perform the service, associated with the online charging action, when a first type of communication session is being established,
instruct the PGW device to establish a connection with a third server device to perform the service, associated with the offline charging action, when a second type of communication session is being established, and
instruct a fourth server device to monitor a period of time associated with the communication session, when a third type of communication session is being established, wherein the third type of communication session is different from the first type of communication session and the second type of communication session, and
wherein the PGW device is configured not to establish a connection with the first server and the second server when the third type of communication is being established.

19. The system of claim 18, where the third type of communication session corresponds to at least a prepaid voice over Internet protocol (VoIP) session.

20. The system of claim 18, where the subscriber profile includes:

first information that identifies whether a real-time reporting (RTR) service is to be performed based on the type of communication session,
second information that identifies whether a usage control (UC) service is to be performed based on the type of communication session,
third information that indicates that the online charging action is to be performed when the type of communication session is associated with a prepaid data service,
fourth information that indicates that neither the online charging action nor the offline charging action is to be performed when the type of communication session corresponds to a prepaid voice over Internet protocol (VoIP) session or a postpaid voice service, or
fifth information that indicates that the offline charging action is to be performed when the type of communication session is associated with a postpaid data service.

21. The system of claim 18, where the fourth server device corresponds to a call session control function (CSCF) device that processes calls associated with a prepaid voice service or a prepaid voice over Internet protocol (VoIP) session, or
where the fourth server device corresponds to a mobility management entity (MME) device that processes traffic associated with a prepaid data service or a postpaid data service.

22. The system of claim 18, where, when obtaining the subscriber profile, the PCRF device is further to:
establish a communication, with the first server device and via a particular interface, that allows the subscriber profile to be obtained, and
obtain the subscriber profile, from the first server device, via the particular interface.

23. The system of claim 18, where, when instructing the PGW device to establish the connection with the second server device, the PCRF device is further to:
establish a communication, with the PGW device and via a particular interface, that allows PCRF device to instruct the PGW device to establish the connection with the second server device.

24. The system of claim 18, where, when instructing the fourth server device to monitor the period of time associated with the communication session, the PCRF device is further to:
instruct the PWG device not to establish the connection with the second server device or the third server device.

25. The system of claim 18 where the service include at least one of:
a first service to monitor a quantity of data or bandwidth used, by the user device, during the communication session that allows near real-time billing information to be generated,
a second service that provides near real-time reporting, to the PGW device, based on the quantity of data or bandwidth used by the user device, or
a third service that terminates the communication session or decreases the quantity of data or bandwidth, used by the user device, when the quantity of data or bandwidth is greater than a threshold.

* * * * *